Patented Sept. 4, 1923.

1,467,197

UNITED STATES PATENT OFFICE.

WILLIAM FRASER RUSSELL, OF NORWALK, CONNECTICUT, ASSIGNOR TO THE NORWALK TIRE & RUBBER COMPANY, OF NORWALK, CONNECTICUT, A CORPORATION OF CONNECTICUT.

ART OF VULCANIZING RUBBER.

No Drawing. Application filed April 26, 1922, Serial No. 556,770. Renewed April 9, 1923.

*To all whom it may concern:*

Be it known that I, WILLIAM FRASER RUSSELL, a subject of the King of England, residing at Norwalk, in the county of Fairfield, State of Connecticut, have invented certain new and useful Improvements in the Art of Vulcanizing Rubber; and I do hereby declare the following to be a full, clear, and exact description of the invention, such as will enable others skilled in the art to which it appertains to make and use the same.

This invention relates to improvements in the vulcanization of rubber, and more particularly in the hot vulcanization of rubber mixtures containing zinc oxide, as well as mixtures containing both zinc oxide and organic accelerators, in addition to sulphur. The invention includes improvements in the vulcanization process as well as in the products thereof.

It is well known in the art that raw rubber, and in particular plantation rubber, is subject to great variation in its behavior on vulcanization. That is to say, different samples of raw rubber, when vulcanized with sulphur under constant conditions, yield products which vary enormously in their properties and characteristics. In commercial practice, however, rubber is practically never vulcanized with sulphur alone; but the present art of compounding and vulcanizing rubber utilizes, in addition to sulphur, a multiplicity of auxiliary materials, of which zinc oxide is perhaps the most important.

Zinc oxide is generally regarded as a rubber toughener, and as such is used in enormous quantities in the industry. Practically all high grade rubber products contain it in amounts running from a few per cent to over fifty per cent by weight. The nature of the action of zinc oxide in vulcanization is still obscure. When zinc oxide is used the natural variation in raw rubber is not equalized, but on the contrary, a new and entirely different kind of variation is encountered to that which is encountered in vulcanizing rubber with sulphur alone. This variation, however, is not generally known. As a consequence of this variation, some types of raw rubber, when vulcanized with sulphur and with the addition of a small quantity of zinc oxide (e. g. 3%, more or less, of the weight of the rubber) yield products which are stronger physically and more perfectly cured than they would be without the addition of the zinc oxide; while other types of raw rubber are not thus benefitted.

This variable effect of zinc oxide in vulcanization is not overcome or minimized by the use of the customary organic accelerators of vulcanization but on the contrary it is greatly accentuated by the majority of these substances. Hence, if a standard test formula be adopted containing zinc oxide, for example, the formula illustrated below, and if samples from various shipments of rubber are tested by such a formula, it will be found that, under the conditions of the test, many types of rubber will cure perfectly, yielding strong, well-vulcanized products greatly superior to the products which will be obtained without the zinc oxide. On the other hand, many other types of rubber will hardly cure at all under these conditions, the rubber being left soft and flabby, and in many cases no better and frequently worse than the corresponding products cured without zinc oxide.

For example, if a standard test formula be adopted containing 3 parts of zinc oxide, 5 parts of sulphur and 0.25 parts of p-phenylenediamine (or its equivalent of another accelerator) per 100 parts of rubber, and if the test be carried out by vulcanization under constant conditions of time and temperature, for example, 45 minutes at 50 lbs. steam pressure (148° C.) variations may be encountered with samples from different shipments of rubber, such as are illustrated by the following examples:

|  | Sample No. 1. | | Sample No. 2. | |
| --- | --- | --- | --- | --- |
|  | Without ZnO. | With ZnO. | Without ZnO. | With ZnO. |
| Tensile strength | 1477 lbs. sq. in. | 2540 lbs. sq. in. | 826 lbs. sq. in. | 828 lbs. sq. in. |
| Elong. at break | 993% | 877% | 853% | 773%. |

In the case of the first sample it will be noted that the zinc oxide exerts a very beneficial influence on the physical character of the vulcanized product, giving a product greatly superior to that obtained without zinc oxide. In the case of the second sample, however, no such improvement was observed, and the product is of comparatively little value.

In practice, different types of rubber will be found varying from those which are greatly improved by zinc oxide to those which do not respond to the presence of zinc oxide, and including intermediate types which respond to a varying degree. For the purposes of the present invention those types of rubber which do not respond satisfactorily to zinc oxide during vulcanization, i. e., which do not give strong well-vulcanized products when tested by the method above described, will be referred to generally as weak rubber; while rubbers which do respond, will be referred to generally as strong rubber.

The lack of response to zinc oxide is observed in many grades of plantation rubber, and is a very series defect in them, particularly as it is not overcome by the use of most organic accelerators. The great majority of these substances are effective only in rubber which shows a good response to zinc oxide, for example, thiocarbanilid, p-nitrosodimethylaniline, p-phenylenediamine, urea, aldehyde-ammonia, etc. When used with zinc oxide in weak rubbers, these substances are practically useless, and, with few exceptions, increasing their amount in the mixing does not lead to material improvement.

The variable behavior of rubber toward zinc oxide on vulcanization may be disastrous in manufacturing practice, where uniformity of product, and uniformly high grade products are highly desirable. In an attempt to overcome this variation, different shipments of rubber have been blended or mixed with a view to averaging their behavior on vulcanization, but this is at best a hit or miss method. The art has not heretofore, in so far as I am aware, had any means or method of treating rubber in such a way as to overcome the defect above mentioned of weak rubber, so as to enable a given formula automatically to take care of all types of rubber and yield uniformly well-vulcanized products without the necessity of mixing or blending the various types of rubber according to test.

The present invention provides such a method, according to which weak rubber can be treated without admixture with other rubber, to give strong well-vulcanized products. The present invention further provides a method whereby all ordinary types of rubber, such as plantation rubbers, and including weak rubber and rubber of intermediate quality, as well as normally strong rubber, can be converted into uniformly well-vulcanized products without the necessity of admixture or blending of different types of rubber, according to test. The present invention for the first time, so far as I am aware, makes possible the obtaining of such uniform, and uniformly well-vulcanized products, from rubber varying widely in its responsiveness to zinc oxide.

I have observed that with rubbers which respond to or are improved by zinc oxide during vulcanization, a very appreciable amount of the zinc oxide disappears or becomes dissolved in the rubber during the vulcanization process; and that, in cases where the zinc oxide is not more than about 3%, clear transparent vulcanizates may often be obtained in which all the zinc oxide has thus disappeared. I have further observed, that weak rubbers which are not improved by zinc oxide during vulcanization do not show an appreciable dissolution of zinc oxide during vulcanization, even if the cure is greatly prolonged. This observation of the dissolution of zinc oxide in rubber, in the case of rubbers which are improved by zinc oxide during vulcanization, has not heretofore, in so far as I am aware, been made or recorded, nor has the observation that such dissolution does not take place in the case of weak rubbers.

I have made the discovery that the defects of weak rubbers, above referred to, can be overcome, and that such rubbers can be rendered more or less strongly responsive to zinc oxide by adding to them prior to vulcanization certain substances, particularly acid substances, which have the power to combine with zinc oxide during the process of vulcanization, and, by an action apparently catalytic, to effect or promote dissolution of the zinc oxide in the rubber.

I have further discovered that not only can rubbers, which are weak or unresponsive to zinc oxide, be made to respond on vulcanization to the physical improving action of zinc oxide, but they can also be made to respond to the accelerating action of the common organic accelerators in much the same way as rubber which normally is improved by zinc oxide. As a result, well-vulcanized valuable products can thus be readily obtained instead of weak or worthless products.

The substances which I have found particularly advantageous in effecting or promoting dissolution of zinc oxide in weak rubber during vulcanization are acids whose zinc salts are substantially soluble in hot aromatic hydrocarbons, such as benzene or xylene, or in terpene hydrocarbons, such as pinene or dipentene, either alone or in the presence of organic bases, such as pyridine or piperidine. When such acids are added, together with zinc oxide, to weak rubbers, they apparently react with zinc oxide during vulcanization to form zinc salts soluble in the hot rubber hydrocarbon, and thus tend to promote the dissolution of zinc oxide in the rubber.

The discovery that acid substances can thus be advantageously used is the more surprising since it is generally supposed in the industry that the presence of acid substances in rubber mixtures is injurious to vulcanization and is to be avoided. It is even believed that acid substances exert a strong retarding effect on vulcanization.

Among the acids or acid substances which I have thus found to be of value in improving the vulcanizing properties of weak rubber in the presence of zinc oxide may be mentioned the following: The acids of the monobasic saturated and unsaturated fatty series and in particular the higher members of said series, such as lauric, palmitic, stearic oleic, and linoleic acids; aryl derivities of fatty acids, such as phenylacetic, phenylpropionic and cinnamic acids; aromatic monobasic acids such as benzoic and toluic acids and their homolouges; certain derivatives of aromatic monobasic acids such as the alkoxybenzoic acids; many resinous substances of an acid character, such for example as colophony, Burgundy pitch and Venice turpentine. Of these acids the most powerful, so far as I have ascertained, are those which are high in molecular weight, low in melting point, and whose zinc salts are the more soluble in the hydrocarbons above mentioned, and I regard these acids, such as the higher monobasic fatty acids, as particularly advantageous.

In addition to the acids above described, I have found that many of their derivatives may be applied instead of the acids with similar effect. For example, they may be applied in the form of their zinc salts either alone or in presence of free zinc oxide, though the zinc salts act best in presence of free zinc oxide. They may also be applied in the form of their salts of ammonia or organic bases where such salts are obtainable, or in the form of their double salts of zinc and ammonia or organic bases, or in the form of derivatives which will produce results comparable with the effect of the free acid.

The improved process of the present invention is particularly advantageous when the acid substances are used together with organic accelerators which appear to play an important part in assisting the acid substances to form rubber soluble zinc derivatives during vulcanization. The acids thus produce the desired effect in weak rubber to the greatest degree in the presence of such accelerators. This action is further indicated by analogy, from the fact that the hot xylene solution of such an acid (which is effective in rubber) may not appreciably dissolve zinc oxide unless an organic base, for example, pyridine or piperidine is present. Under such conditions a xylene-soluble double salt of the acid with zinc and with the organic base is apparently formed. Since the common organic accelerators are for the most part nitrogenous substances which are either themselves basic or capable of generating bases during the vulcanization process, they appear to promote the action of the acid substances, and the dissolution of zinc oxide by forming similar double salts or compounds. That the action of the acid substances in conjunction with accelerators, in promoting the dissolution of zinc oxide in the rubber during vulcanization is a catalytic one is indicated by the fact that they will cause the dissolution of more zinc oxide than they will normally combine with to form zinc salts. Only small quantities are accordingly required.

In general, the amount of acid or acid substances, or other substances above mentioned, to be added in the practice of the invention, may vary from a fraction of one per cent up to several per cent. When such amounts of these substances are added to weak rubber which is compounded with sulphur, zinc oxide, and a small quantity of an organic accelerator, a more or less pronounced enhancement of the physical strength of the rubber will be effected with the resulting production of vulcanized products of greatly improved quality and strength, much superior to those which would be obtained without the addition of such substances.

The addition of small amounts of the acid substances will also enable the organic accelerators used in the mixture to function properly, even with weak rubbers, so that the rate of the cure desired may, within limits be regulated by varying the amount of the accelerator,—something which would ordinarily be practically impossible with such rubbers.

Inasmuch as rubber varies in its responsiveness or lack of responsiveness to zinc oxide, it will be found that the degree of physical improvement in the vulcanizate produced from weak rubber by the use of a given amount of the substances above referred to, will correspondingly vary, depending upon the degree of the weakness or lack of responsiveness to zinc oxide shown by the rubber. That is, rubber which is very weak or lacking in responsiveness to zinc oxide will show the greatest improvement; while rubber which is normally highly responsive to zinc oxide may not be affected to any considerable extent; while rubbers of an intermediate character will be found improved correspondingly. Even with the highly responsive rubbers, however, the addition of such substances is unobjectionable and may even be advantageous. Accordingly, by adding such substances, and in particular, the higher monobasic fatty acids or their derivatives, to rubber in general, well-vulcanized products can be obtained from almost any ordinary kind of rubber, particularly plantation rubbers of varying responsiveness. A practical means is thus provided for avoiding the serious effects resulting from the variable character of raw rubber, and for insuring the production of uniformly high grade products from rubber of variable characteristics.

The present invention also represents an important improvement and advance in the application of organic accelerators. As above indicated, the majority of these accelerators are only effective with zinc oxide when used in rubber which is normally responsive to zinc oxide; and when used with zinc oxide in rubbers which are unresponsive or only slightly responsive to zinc oxide, they fail to function properly. The present invention enables such ineffective accelerators to function properly even in weak rubbers, which are normally unresponsive both to zinc oxide and to such accelerators.

In the commercial practice of the invention I do not limit myself to the use of the pure substances alone, but I may also use with good results mixtures of such substances and even more or less impure commercial products containing such substances.

I have also found that the zinc salts of certain of the acids mentioned above can be advantageously used in some instances without free zinc oxide, but in general, I have obtained the best results when the zinc salts are used together with free zinc oxide or zinc hydroxide.

In the foregoing I have referred only to zinc oxide as the rubber toughener the variable effect of which is overcome or minimized by my invention, since zinc oxide is the toughener commonly used. My investigations show, however, that the advantages of the invention may be attained to a substantial degree when other metallic oxides such, for example, as the oxides of lead, aluminum and manganese are substituted for the zinc oxide, although the action of such other metallic oxides is, in general, less pronounced than that of zinc oxide. It will be understood, therefore, that when, in this specification and the claims, I refer to zinc oxide I intend to cover the use not only of zinc oxide but also of any other metallic oxide having properties similar to zinc oxide in the vulcanization of rubber.

The invention is of more or less general application to the treatment of vulcanizaton of rubber and rubber mixtures. It is particularly advantageous, as above pointed out, with normally weak rubbers; but it is generally applicable to the treatment of rubbers of varying responsiveness to zinc oxide, and enables rubber of varying degrees of responsiveness, or lack of responsiveness, to become highly responsive. I do not accordingly confine myself to the vulcanization of any one type of rubber mixing. The invention is applicable to varying types of technical compounds containing zinc oxide, and the amount of zinc oxide may vary from a fraction of one per cent of the weight of the rubber to over one hundred per cent, according to the qualities desired in the vulcanized product.

The invention can be carried out without the addition of accelerators in the rubber mixtures to be vulcanized, but the improvements produced in such cases are less pronounced than when added organic accelerators are present, and the invention is accordingly particularly advantageous when such organic accelerators are also used. I have found urea to be particularly advantageous as an accelerator in the process of the present invention for the reason that it is non-toxic and can be used without giving off objectionable toxic or poisonous, gaseous, decomposition products during vulcanization, while it is nevertheless an effective accelerator in rubber mixtures such as those vulcanized according to the present invention.

Ordinarily, in commercial practice, the fatty acids or other substances, such as those above referred to, will be added to the rubber mixing on the mill, together with the other compounding ingredients. They may, however, be added to the raw rubber, for example, during its production on the plantation. Thus a small amount of fatty acid may be added to the rubber while it is undergoing the crêpeing or sheeting operation so that the rubber shipped from the plantation will already contain the added fatty acid when it is subsequently compounded and vulvanized. A small amount of fatty acid may also be added to the rubber latex and incorporated with the rubber on coagulation of the latex; or small amounts of animal or vegetable fats (glycerides) may be added to the latex, where the latex itself contains enzymes or saponifying substances which will set free fatty acids from the oils added.

The invention and its advantages will be illustrated by the following specific examples:

*Example I.—Vulcanization without the use of added organic accelerators.*

100 parts of thick brown crêpe, which on testing was found to be weak, was mixed with 4 parts of zinc oxide and 8 parts of sulphur. In addition similar mixtures were made containing 1½ parts of stearic acid, 1 part of anisic acide and 1 part of zinc stearate respectively. A further compound was made without zinc oxide. Test slabs were cured in a vulcanizing press at a temperature of 148° C. (50 lbs. in² of steam). Physical tests were made on a Scott tester with the following results:

|  | Control. | | 1½ pts. stearic acid. | | 1 pt. anisic acid. | |
|---|---|---|---|---|---|---|
|  | Tensile strength. | Elong. at break. | Tensile strength. | Elong. at break. | Tensile strength. | Elong. at break. |
| Min. | Pounds. Sq. in. | Per ct. | Pounds. Sq. in. | Per ct. | Pounds. Sq. in. | Per ct. |
| 45 | 614 | 830 | 1997 | 770 | 945 | 790. |
| 60 | 840 | 840 | 2560 | 800 | 1229 | 790. |
| 75 | 1024 | 840 | 2560 | 760 | 1587 | 770. |
| 90 | 1331 | 840 | 2415 | 740 | 1890 | 770. |
| 105 | 1536 | 830 | 2279 | 700 | 1995 | 750. |

|  | 1 pt. zinc stearate. | | No zinc oxide. | |
|---|---|---|---|---|
|  | Tensile strength. | Elong. at break. | Tensile strength. | Elong. at break. |
| Min. | Pounds. Sq. in. | Per ct. | Pounds. Sq. in. | Per ct. |
| 45 | 1724 | 780 | 954 | 910. |
| 60 | 2385 | 820 | 1485 | 910. |
| 75 | 2279 | 780 | 2048 | 910. |
| 90 | 2332 | 750 | 2887 | 900. |
| 105 | 2572 | 740 | 3123 | 890. |

These figures show that in this particular sample of rubber zinc oxide alone did not have a beneficial effect. The addition of the above mentioned substances corrected this defect, particularly in the case of stearic acid and zinc stearate which brought about greatly improved vulcanization and enhanced physical strength, particularly in the lower cures.

*Example 2.—Vulcanization with added organic accelerators.*

The following results were obtained with sample No. 2 hereinbefore referred to when vulcanized according to the test formula hereinbefore described. The results show the marked improvements resulting from the addition of two parts of stearic acid, in addition to zinc oxide, as compared with the results obtained with zinc oxide alone, and without zinc oxide. While zinc oxide alone brought about no improvement, the addition of the stearic acid resulted in an improvement such that the vulcanized product became comparable with that obtained with sample No. 1, hereinbefore described, when vulcanized by the same test formula.

|  | Without ZnO. | With ZnO. | With ZnO and 2 parts stearic acid. |
|---|---|---|---|
| Tensile strength | 826 lbs. sq. in. | 828 lbs. sq. in. | 2541 lbs. sq. in |
| Elongation at break. | 853% | 773% | 793%. |

*Example 3.*

The following compounds were mixed on the mill, and from the mixtures a series of slabs were made and cured in a vulcanizing press at the temperature of 50 lbs. of steam. The slabs were then tested for tensile strength and elongation at break in the usual way on a Scott tester. The two compounds show the results obtained with the accelerator, but without oleic acid, and the results obtained with both the accelerator and oleic acid.

|  | I. | II. |
|---|---|---|
| Weak brown crêpe | 100 | 100 |
| Zinc oxide | 3 | 3 |
| Sulphur | 5 | 5 |
| P-nitrosodimethylaniline | 0.25 | 0.25 |
| Oleic acid | 0 | 1.5 |

| Time of cure. | I. | | II. | |
|---|---|---|---|---|
|  | Tensile strength. | Elong. at break. | Tensile strength. | Elong. at break. |
| 20 min. X 50 lbs. | 825 lbs. sq. in. | 870% | 1745 lbs. sq. in. | 800% |
| 30 " " | 935 " " | 860% | 2713 " | 790% |
| 45 " " | 1045 " " | 850% | 2970 " | 760% |
| 60 " " | 1272 " " | 860% | 2713 " | 740% |

*Example 4.*

The following results were obtained in a similar way with mixtures containing thiocarbanilide as an accelerator, without and with the addition of oleic acid.

|  | I. | II. |
|---|---|---|
| Weak brown crêpe | 100 | 100 |
| Zinc oxide | 3 | 3 |
| Sulphur | 5 | 5 |
| Thiocarbanilide | 1 | 1 |
| Oleic acid | 0 | 1.5 |

| Time of cure. | I. | | II. | |
|---|---|---|---|---|
|  | Tensile strength. | Elong. at break. | Tensile strength. | Elong. at break. |
| 60 min X 50 lbs. | 212 lbs. sq. in. | 810% | 1280 lbs. sq. in. | 810% |
| 75 " | | | 1683 " | 820% |
| 90 " | 495 " | 840% | 2067 " | 830% |
| 105 " | | | 1968 " | 830% |
| 120 " | 605 " | 850% | 2120 " | 820% |

*Example 5.*

The following compounds were formed and treated in a similar way, using urea as an accelerator. They illustrate a technical compound suitable for a black tread for automobile tires.

|  | I. | II. |
|---|---|---|
| Weak crêpe | 300 | 300 |
| High grade reclaim | 51 | 51 |
| Mineral rubber | 20 | 20 |
| Zinc oxide | 75 | 75 |
| Carbon black | 60 | 60 |
| Sulphur | 15 | 15 |
| Urea | 1.5 | 1.5 |
| Stearic acid | 0 | 9 |

|  | I. | | II. | |
|---|---|---|---|---|
| Time of cure. | Tensile strength. | Elong. at break. | Tensile strength. | Elong. at break. |
| 45 min. × 50 lbs.. | 1245 lbs. sq. in. | 580% | 2385 lbs. sq. in. | 650% |
| 60 " | 1404 " | 550% | 2611 " | 635% |
| 75 " | 1766 " | 565% | 2432 " | 610% |
| 90 " | 1669 " | 560% | 2304 " | 580% |
| 105 " | 1908 " | 560% | 2332 " | 550% |

*Example 6.*

This example illustrates a technical compound suitable for the white side wall of an automobile tire. The compounds were mixed and treated in the manner indicated in Example 3.

|  | I. | II. |
|---|---|---|
| Weak crêpe | 100 | 100 |
| Zinc oxide | 25 | 25 |
| Lithopone | 35 | 35 |
| Sulphur | 4.5 | 4.5 |
| Hexamethylenetramine | 0.25 | 0.25 |
| Palmitic acid | 0 | 2 |

|  | I. | | II. | |
|---|---|---|---|---|
| Time of cure. | Tensile strength. | Elong. at break. | Tensile strength. | Elong. at break. |
| 45 min. × 50 lbs.. | 1219 lbs. sq. in. | 675% | 2296 lbs. sq. in. | 690% |
| 60 " | 1540 " | 670% | 2924 " | 710% |
| 75 " | 1823 " | 670% | 2798 " | 690% |
| 90 " | 2295 " | 710% | 2597 " | 670% |
| 120 " | 2041 " | 670% | 2430 " | 690% |

*Example 7.*

This example illustrates the use of lead oxide as a substitute for zinc oxide, in accordance with my invention.

100 parts of weak brown crêpe were mixed on the mill with 4 parts of lead oxide, 5 parts of sulphur and 0.25 parts of paraphenylenediamine. The same compound was also made with addition of 1.5 parts of oleic acid.

On curing these mixtures in a vulcanizing press for 45 minutes at 148° C. the following results were obtained.

|  | Without oleic acid. | With oleic acid. |
|---|---|---|
| Tensile strength | 921 lbs. sq. in. | 2000 lbs. sq. in. |
| Elongation | 820% | 870%. |

From these examples it will be seen that a radical improvement in the properties of the vulcanized product is brought about by the addition of even a small amount of a fatty acid, and that weak rubbers are thereby converted into vulcanized products comparable with those obtained from strong rubber.

Where the rubber is intermediate in its properties between weak and strong rubber, a similar, although less marked, improvement can be obtained; while by adding a small amount of the fatty acids, or other acid compounds, and accelerators, to plantation rubber generally the rubber which is weak or unresponsive to zinc oxide will be improved and made more nearly comparable with strong rubber, while intermediate grades of rubber will be similarly improved although to a less extent, with the result that a uniformity and improvement in quality of the vulcanized products is obtainable which has not heretofore been obtainable in commercial practice.

The improved products produced according to the present invention will be characterized by the improved properties imparted to them by the improved method of vulcanization and they will also have a characteristic composition, due to the added substances and to the dissolution of zinc oxide brought about thereby. Thus weak rubber which when subjected to vulcanization in the ordinary way would be inferior in properties, and which would be practically free from dissolved zinc oxide, can be converted by the present invention into strong vulcanized products containing an appreciable amount of zinc oxide dissolved therein and combined therewith in the manner characteristic of the invention.

I claim:

1. The method of overcoming the variability of rubber on vulcanization with sulphur and zinc oxide, which comprises adding to rubber mixtures containing sulphur and zinc oxide, substances capable of promoting dissolution of the zinc oxide in the rubber, and vulcanizing the resulting mixture with the production of uniformly strong and well vulcanized products.

2. The method of overcoming the variability of rubber on vulcanization with sulphur and zinc oxide, which comprises adding to rubber mixtures containing sulphur and zinc oxide, a small amount of an acid or acid substance capable of promoting dissolution of the zinc oxide in the rubber, and vulcanizing the resulting mixture with the production of uniformly strong and well vulcanized products.

3. The method of improving the vulcanization of rubber mixtures containing sulfur and zinc oxide, which comprises adding to the mixture a zinc derivative capable of promoting dissolution of the zinc oxide in the rubber, and vulcanizing the resulting mixture.

4. The method of improving the vulcanization of rubber mixtures containing sulfur and zinc oxide, which comprises adding to the mixture an acid or acid substance or derivative which forms a xylene-soluble zinc salt and vulcanizing the resulting mixture.

5. The method of improving the vulcanization of rubber mixtures containing sulfur and zinc oxide, which comprises ading to the mixture a xylene-soluble zinc salt or derivative and vulcanizing the resulting mixture.

6. The method of improving the vulcanization or rubber mixtures containing sulfur and zinc oxide, which comprises adding to the mixture an acid or acid substance or derivative capable of promoting dissolution or zinc oxide in the rubber, together with a small amount of an organic accelerator, and vulcanizing the resulting mixture.

7. The method of improving the vulcanization of rubber mixtures containing sulfur and zinc oxide, which comprises adding to the mixture a small amount of zinc salt, or derivative capable of promoting dissolution of the zinc oxide in the rubber, together with a small amount of an organic accelerator, and vulcanizing the resulting mixture.

8. The method of improving the vulcanization of rubber mixtures containing sulfur and zinc oxide, which comprises adding to the mixture a xylene-soluble zinc salt or derivative, or an acid or acid substance which forms a xylene-soluble zinc salt or derivative, together with a small amount of an organic accelerator, and vulcanizing the resulting mixture.

9. The method of improving the vulcanization of rubber mixtures containing sulfur and zinc oxide, which comprises adding to the mixture a small amount of a monobasic fatty acid, and vulcanizing the resulting mixture.

10. The method of improving the vulcanization of rubber mixtures containing sulfur and zinc oxide, which comprises adding to the mixture the zinc salt of a monobasic fatty acid, and vulcanizing the resulting mixture.

11. The method of improving the vulcanization of rubber mixtures containing sulfur and zinc oxide, which comprises adding to the mixture a small amount of a higher monobasic fatty acid, together with a small amount of an organic accelerator, and vulcanizing the resulting mixture.

12. The method of improving the vulcanization of rubber mixtures containing sulfur and zinc oxide, which comprises adding to the mixture a zinc salt of a higher fatty acid, together with a small amount of an organic accelerator, and vulcanizing the resulting mixture.

13. The method of improving the vulcanization of rubber mixtures containing sulfur and zinc oxide, which comprises adding to the mixture an aromatic monobasic acid or derivative which forms a xylene-soluble zinc compound and vulcanizing the resulting mixture.

14. The method of improving the vulcanization of rubber with sulfur, which comprises adding a xylene-soluble zinc derivative and vulcanizing the resulting mixture.

15. The method of improving the vulcanization of rubber with sulfur, which comprises adding a small amount of a zinc salt of a higher monobasic fatty acid, and vulcanizing the resulting mixture.

16. The method of improving the vulcanization of rubber with sulfur, which comprises adding a xylene-soluble zinc derivative together with a small amount of an organic accelerator, and vulcanizing the resulting mixture.

17. The method of improving the vulcanization of rubber with sulfur, which comprises adding a small amount of a zinc salt of a higher fatty acid, together with a small amount of an organic accelerator, and vulcanizing the resulting mixture.

18. The method of improving the vulcanization of rubber mixtures containing sulfur and zinc oxide, which comprises adding to the mixture a small amount of an acid or acid substance or of a zinc salt or derivative capable of promoting dissolution of zinc oxide in the rubber, together with a small amount of urea, and vulcanizing the resulting mixture.

19. The method of improving the vulcanization of rubber mixtures containing sulfur and zinc oxide, which comprises adding to the mixture a small amount of a higher monobasic fatty acid together with a small amount of urea, and vulcanizing the resulting mixture.

20. Vulcanized rubber products, resulting from the vulcanization of inferior rubber with sulfur, zinc oxide and added substances promoting dissolution of the zinc oxide, said products containing zinc oxide in a state of dissolution therein, and being uniformly strong and well vulcanized products.

21. Vulcanized rubber products, resulting from the vulcanization of inferior rubber with sulfur, zinc oxide and added acid substances, said products containing zinc oxide in a state of dissolution therein, and being uniformly strong and well vulcanized products.

22. Vulcanized rubber products, resulting from the vulcanization of inferior rubber with sulfur, a zinc oxide and a small amount of higher fatty acid, said products containing zinc oxide in a state of dissolution therein, and being uniformly strong and well vulcanized products.

23. Vulcanized rubber products, resulting from the vulcanization of rubber with sulfur, zinc oxide and a small amount of an acid or acid substance which forms a xylene-soluble zinc compound, together with a small amount of an organic accelerator, said products containing zinc oxide in a state of dissolution therein.

24. Vulcanized rubber products, resulting from the vulcanization of rubber with sulfur, zinc oxide, a small amount of a higher fatty acid and a small amount of an organic accelerator, said products containing zinc oxide in a state of dissolution therein.

25. Vulcanized rubber products, resulting from the vulcanization of rubber with sulfur, zinc oxide, substances promoting dissolution of zinc oxide in the rubber and urea, said products containing zinc oxide in a state of dissolution therein.

26. The method of overcoming the variability of rubber on vulcanization with sulphur and zinc oxide, which comprises adding to rubber mixings containing sulphur and a metallic oxide, a substance capable of promoting the dissolution of the metallic oxide in the rubber, and vulcanizing the resulting mixture with the production of uniformly strong and well vulcanized products.

27. The method of effecting improved vulcanization of rubber which consists in adding to rubber mixings containing sulphur, a metallic oxide together with an accelerator of vulcanization and a substance capable of promoting dissolution of the metallic oxide in the rubber, and vulcanizing the resultant mixtures.

In testimony whereof I affix my signature.

WILLIAM FRASER RUSSELL.